(12) United States Patent
Liu

(10) Patent No.: US 12,498,068 B2
(45) Date of Patent: Dec. 16, 2025

(54) QUICK RELEASE CONNECTOR WITH SAFETY BUTTON

(71) Applicant: Hsiu-Hsiung Liu, New Taipei (TW)

(72) Inventor: Hsiu-Hsiung Liu, New Taipei (TW)

(*) Notice: Subject to any disclaimer, the term of this patent is extended or adjusted under 35 U.S.C. 154(b) by 142 days.

(21) Appl. No.: 18/434,202

(22) Filed: Feb. 6, 2024

(65) Prior Publication Data

US 2025/0251070 A1    Aug. 7, 2025

(51) Int. Cl.
*F16L 37/23* (2006.01)
*F16L 37/084* (2006.01)
*F16L 37/40* (2006.01)

(52) U.S. Cl.
CPC ........... *F16L 37/23* (2013.01); *F16L 37/0841* (2013.01); *F16L 37/40* (2013.01); *F16L 2201/20* (2013.01)

(58) Field of Classification Search
CPC ... F16L 37/23; F16L 37/0841; F16L 2201/20; F16L 37/40; F16L 37/32
See application file for complete search history.

(56) References Cited

U.S. PATENT DOCUMENTS

| | | | | |
|---|---|---|---|---|
| 2,708,589 A * | 5/1955 | Masek | ...................... | F16L 37/23 251/149.6 |
| 2,730,382 A * | 1/1956 | Stefano | .................... | F16L 37/40 251/149.6 |
| 3,567,175 A * | 3/1971 | Sciuto, Jr. | ................ | F16L 37/40 251/149.6 |
| 4,060,219 A * | 11/1977 | Crawford | ................. | F16L 37/40 251/149.6 |
| 5,002,254 A * | 3/1991 | Belisaire | ................... | F16L 37/23 251/149.8 |
| 5,535,985 A * | 7/1996 | Larbuisson | .............. | F16L 37/42 251/149.6 |
| 5,806,832 A * | 9/1998 | Larbuisson | .......... | F16L 37/0841 251/149.6 |
| 6,840,548 B2 * | 1/2005 | Lacroix | .................... | F16L 37/42 285/308 |
| 6,926,312 B2 * | 8/2005 | Lacroix | .................... | F16L 37/40 285/317 |
| 7,472,930 B2 * | 1/2009 | Tiberghien | .............. | F16L 37/42 285/308 |
| 7,887,102 B2 * | 2/2011 | Tiberghien | ............ | F16L 37/086 285/308 |

(Continued)

FOREIGN PATENT DOCUMENTS

FR    2514855 A1 *    4/1983    .......... F16L 37/0841
FR    2724710 A1 *    3/1996    .......... F16L 37/0841

*Primary Examiner* — David Colon-Morales
(74) *Attorney, Agent, or Firm* — Withrow + Terranova, PLLC; Vincent K. Gustafson

(57) ABSTRACT

A quick release connector has a casing, a safety button, a button spring, a sliding body, and a sliding spring. The safety button is movably disposed in the casing and has an upper rib and a lower rib having a slope facing away from the upper rib. The button spring is disposed between the casing and the safety button. The sliding body is slidable relative to the casing and the safety button and has a first flange and a second flange having a conical surface facing the first flange. The sliding spring is disposed between the casing and the sliding body. To disconnect a plug from the quick release connector, the safety button is pressed to block the sliding body by an engagement between the first flange and the upper rib, and then the safety button is released to release the plug.

12 Claims, 15 Drawing Sheets

(56) References Cited

U.S. PATENT DOCUMENTS

| | | | | |
|---|---|---|---|---|
| 8,256,743 | B2* | 9/2012 | Tiberghien | F16L 37/44 |
| | | | | 251/149.6 |
| 9,464,742 | B2* | 10/2016 | Taguchi | F16L 37/23 |
| 10,247,341 | B2* | 4/2019 | Liu | F16L 37/23 |
| 10,527,213 | B2* | 1/2020 | Liu | F16L 37/42 |
| 11,326,729 | B2* | 5/2022 | Taguchi | F16L 37/40 |
| 11,346,477 | B2* | 5/2022 | Pucci | F16L 37/0841 |
| 2004/0094739 | A1* | 5/2004 | Lacroix | F16L 37/23 |
| | | | | 251/149.1 |
| 2008/0252069 | A1* | 10/2008 | Tiberghien | F16L 37/0841 |
| | | | | 285/81 |
| 2021/0033235 | A1* | 2/2021 | Chen | F16L 17/032 |

\* cited by examiner

QUICK RELEASE CONNECTOR WITH SAFETY BUTTON

BACKGROUND OF THE INVENTION

1. Field of the Invention

The present invention relates to a quick release connector, especially to a quick release connector having a safety button for releasing a plug and being able to prevent the plug from suddenly separating from the quick release connector.

2. Description of the Prior Arts

A quick release connector is applied to connect a pneumatic tool with a pressured source to conduct high pressure gas to the pneumatic tool for work. A conventional quick release connector substantially comprises a body having multiple ball holes, a sliding sleeve being slidable relative to the body, multiple balls disposed in the ball holes and between the sliding sleeve and the body, and a sleeve spring pushing the sliding sleeve. When a plug is connected to the conventional quick release connector, the balls are pushed inwardly by an internal annular surface of the sliding sleeve to engage with an engaging groove formed around the plug. To disconnect the plug, the sliding sleeve is moved back to move the balls outwardly to disengage from the engaging groove of the plug, and then the plug can be removed from the conventional quick release connector.

However, during disengagement, high pressure gas inside the conventional quick release connector will push the conventional quick release connector and the plug away from each other. If the plug and the conventional quick release connector are not firmly held during disengagement, the conventional quick release connector and the plug may be pushed by the high pressure gas therein and separate accidently to hit equipment at workplace or persons staying around.

To overcome the shortcomings, the present invention provides a quick release connector with a safety button to mitigate or obviate the aforementioned problems.

SUMMARY OF THE INVENTION

The main objective of the present invention is to provide a quick release connector having a safety button for releasing a plug and being able to prevent the plug from suddenly separating from the quick release connector.

The quick release connector comprises a casing, a cap, a safety button, a button spring, a sliding body, multiple balls, and a sliding body. The casing includes a first end, a second end being opposite to the first end, a button chamber formed in the casing and having a button opening formed through an external peripheral surface of the casing, and an engagement chamber formed in the casing, located between the first end and the button chamber, and communicating with the button chamber. The cap is connected to the first end of the casing to form a disengagement chamber between the cap and the casing and communicating with the engagement chamber. A diameter of the disengagement chamber is larger than a diameter of the engagement chamber. The safety button is movably disposed in the button chamber of the casing. The safety button includes a button passage, an upper rib, and a lower rib. The button passage is formed through the safety button, communicates with the engagement chamber, and has an upper curved surface concave toward the button opening of the button chamber and a lower curved surface concave away from the button opening of the button chamber. The upper rib protrudes from the upper curved surface of the button passage. The lower rib protrudes from the lower curved surface of the button passage, is located between the upper rib and the engagement chamber, and has a slope facing toward the engagement chamber. The button spring is disposed in the button chamber and between the safety button and the casing to provide a force to push the safety button toward the button opening of the button chamber. The sliding body is slidable relative to the casing and the safety button and extends into the engagement chamber of the casing and the button passage of the safety button. The sliding body includes a channel, a socket portion, multiple ball holes, a switching portion, a first flange, and a second flange. The channel is formed through the sliding body. The socket portion is slidable between the disengagement chamber and the engagement chamber. The multiple ball holes are arranged around the socket portion at angular intervals, are formed through the socket portion, and communicate with the channel. The switching portion extends into the button passage. The first flange radially protrudes from an external peripheral surface of the switching portion and is capable of engaging with the upper rib of the safety button while the safety button is being pressed. The second flange radially protrudes from the external peripheral surface of the switching portion, is located between the first flange and the socket portion, has a conical surface facing toward the first flange, and is capable of engaging with the lower rib of the safety button while the safety button is released. The multiple balls are respectively disposed in the ball holes of the sliding body and are capable of partially extending into the channel. The sliding spring is disposed in the engagement chamber between the casing and the sliding body to provide a force to push the sliding body toward the cap.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
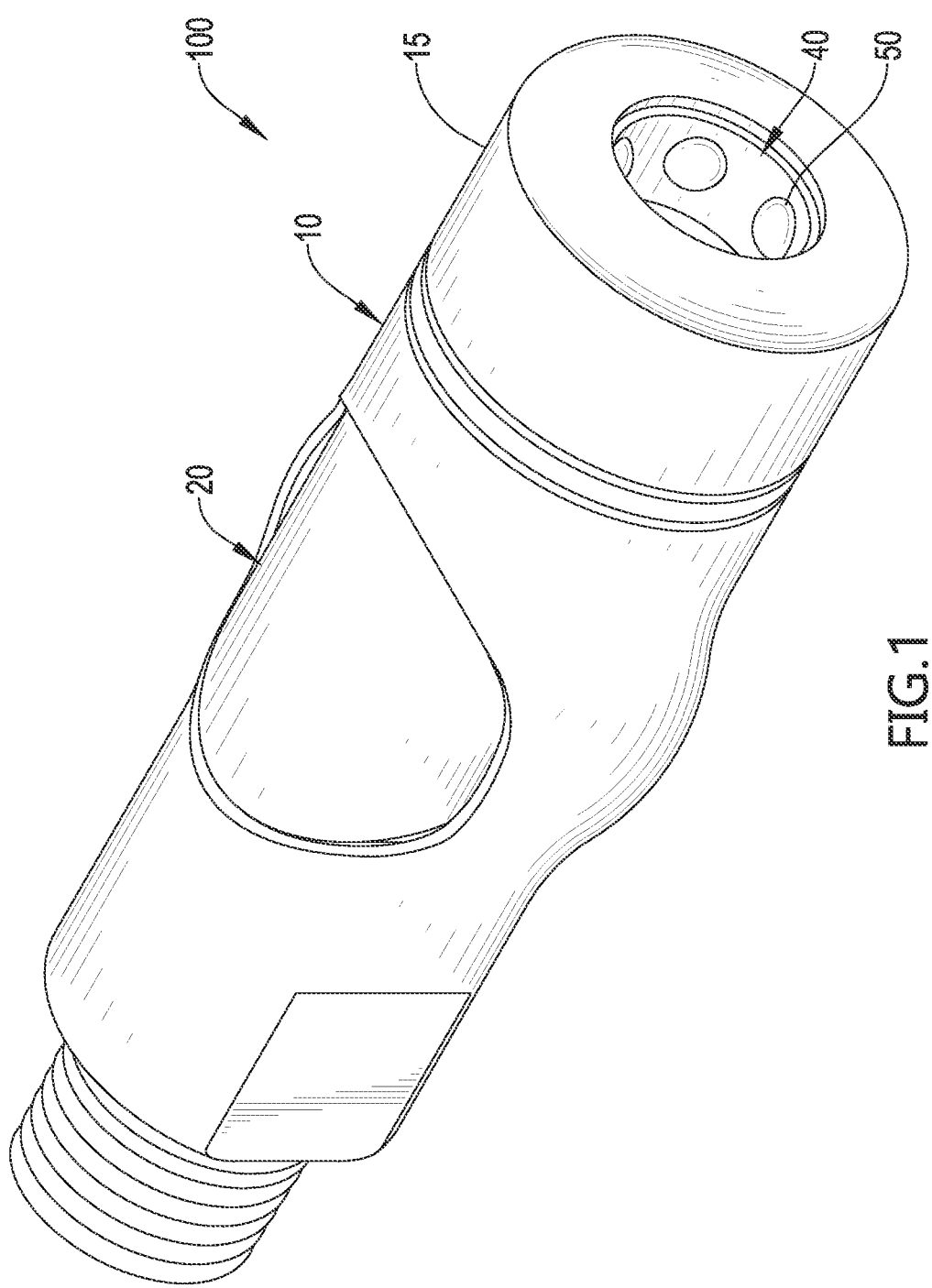
FIG. 1 is a perspective view of a quick release connector in accordance with the present invention.
Figure 2:
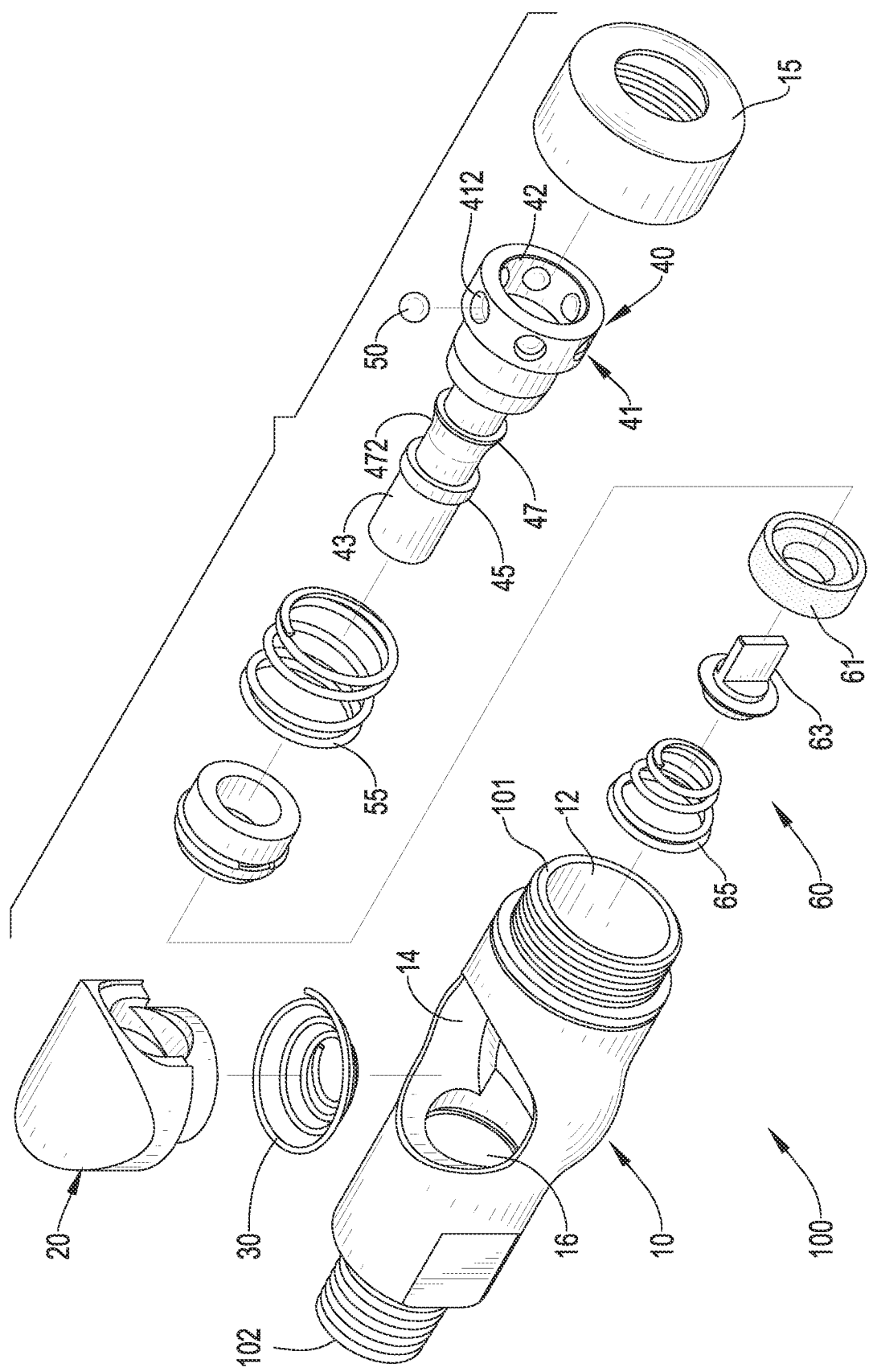
FIG. 2 is an exploded perspective view of the quick release connector in FIG. 1.
Figure 3:
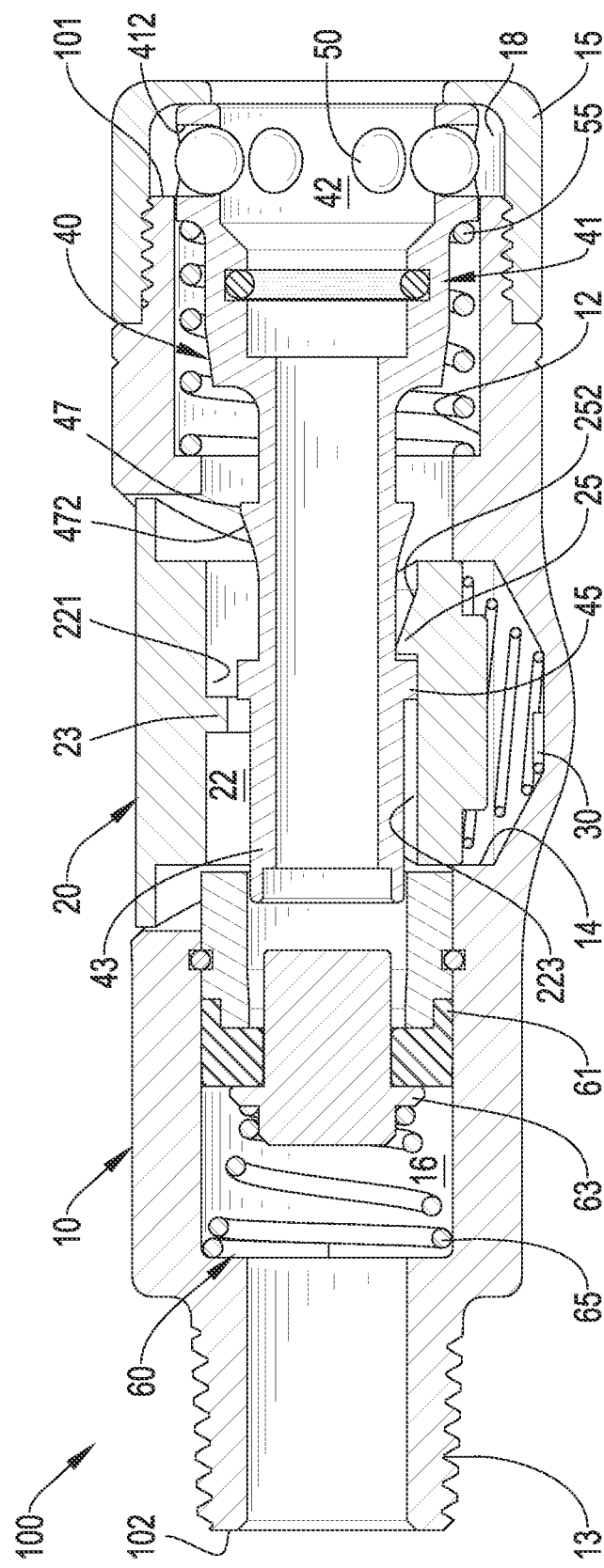
FIG. 3 is a cross sectional side view of the quick release connector in FIG. 1.
Figure 4:
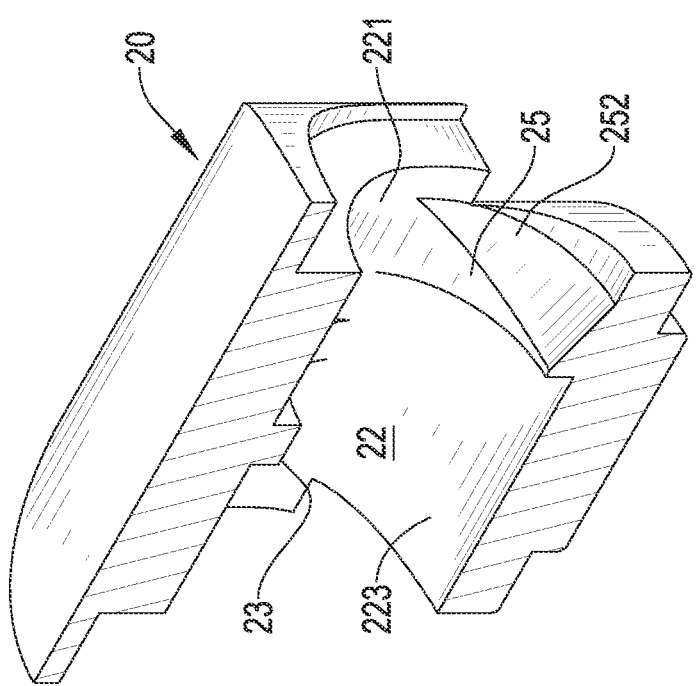
FIG. 4 is a perspective view of a safety button in partial section of the quick release connector in FIG. 2.
Figure 5:
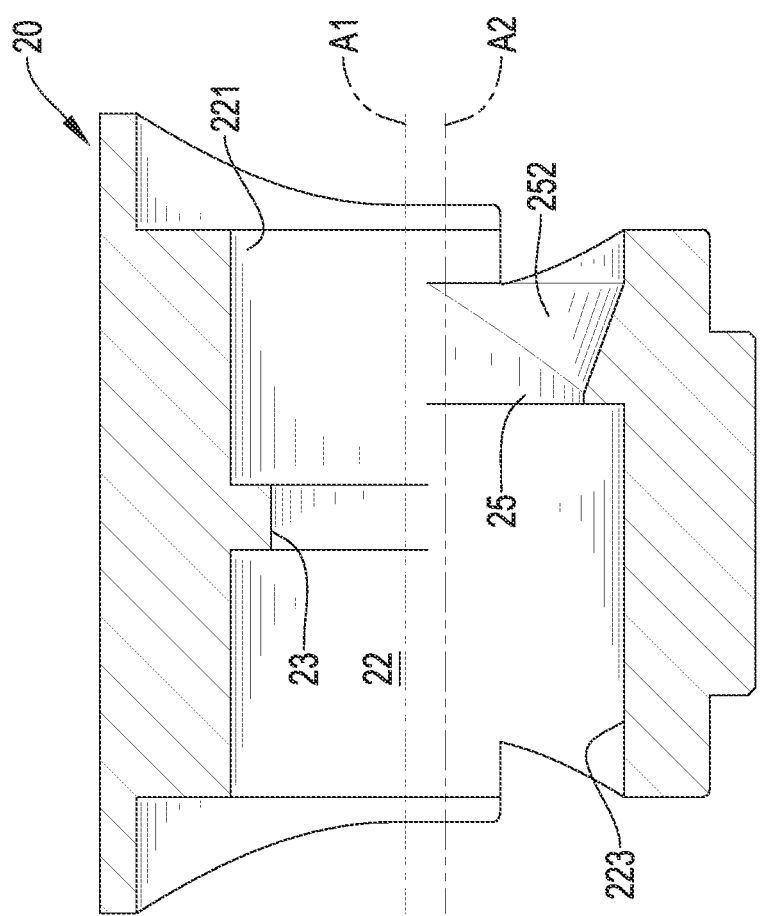
FIG. 5 is a cross sectional side view of the safety button of the quick release connector in FIG. 2.
Figure 6:
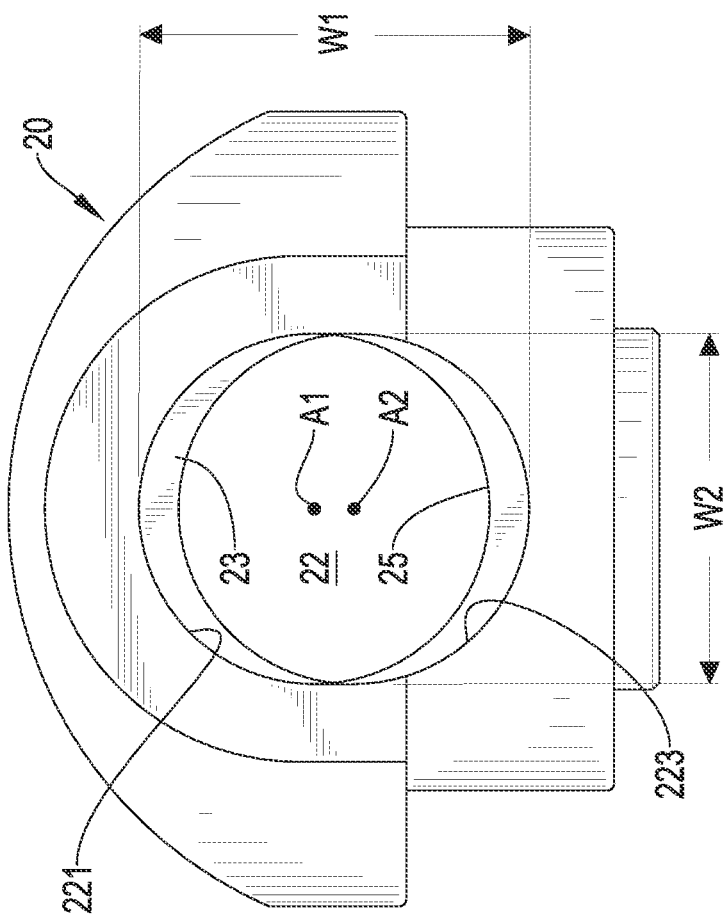
FIG. 6 is a rear end view of the safety button of the quick release connector in FIG. 2.
Figure 7:
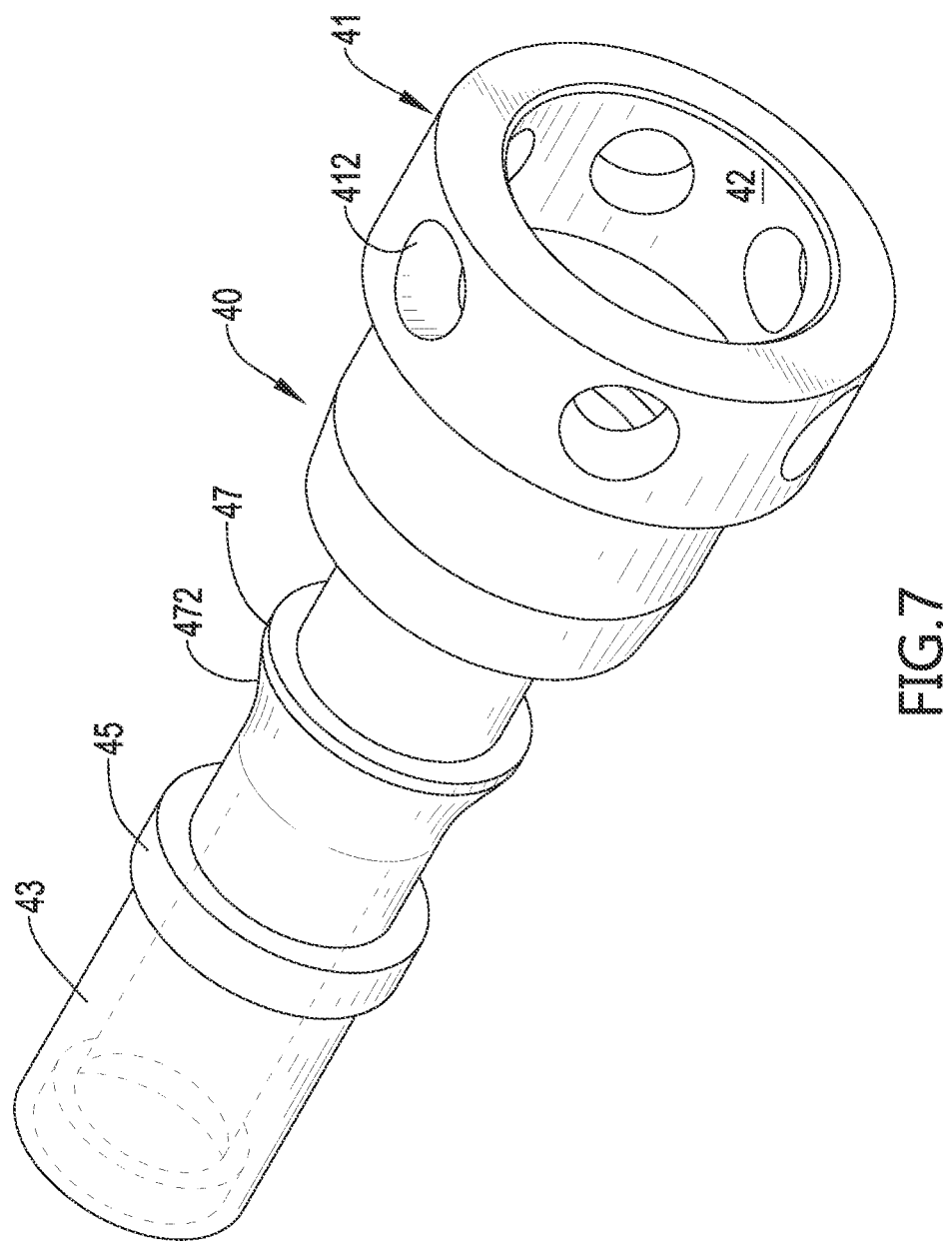
FIG. 7 is a perspective view of a sliding body of the quick release connector in FIG. 2.

With reference to FIGS. 1 to 3, a quick release connector 100 in accordance with the present invention comprises a casing 10, a cap 15, a valve device 60, a safety button 20, a button spring 30, a sliding body 40, multiple balls 50, and a sliding spring 55.

Figure 15:
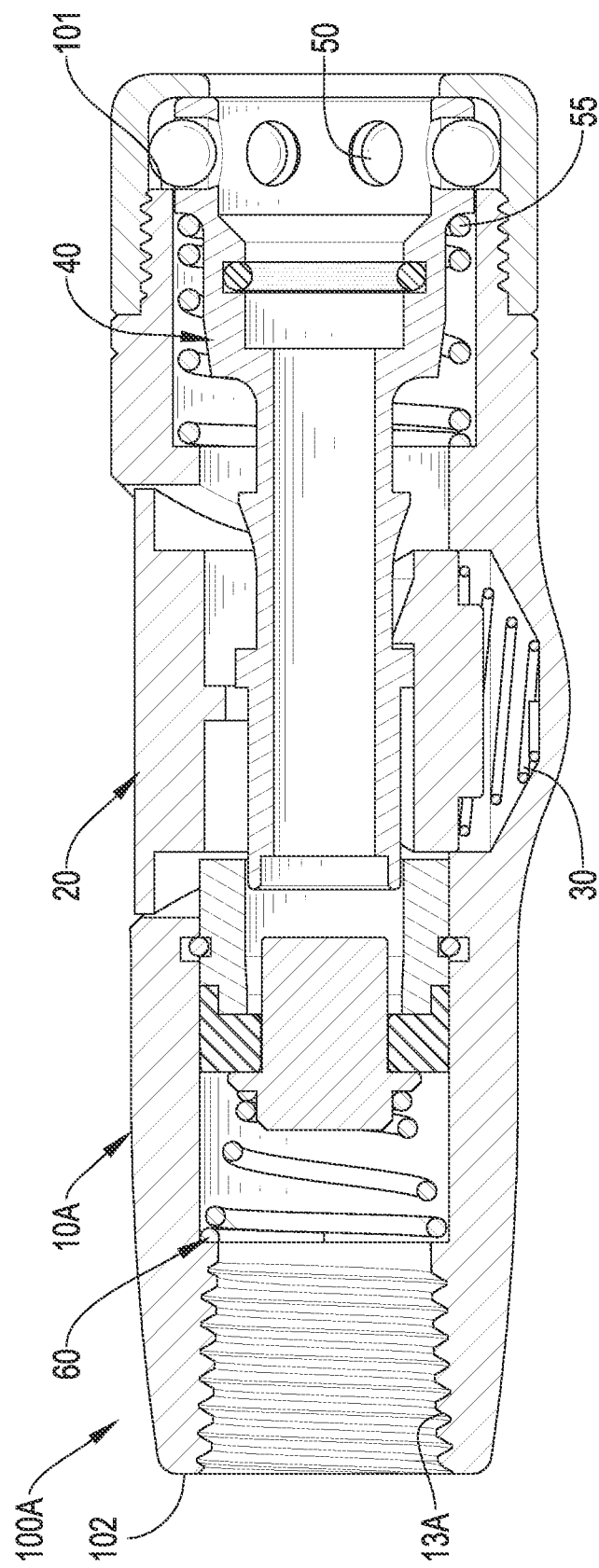
FIG. 15 is a cross-sectional side view of a quick release connector in accordance of the present invention.

With reference to FIGS. 1 to 3, the casing 10 includes a first end 101, a second end 102, a button chamber 14, an engagement chamber 12, and a valve chamber 16. The first end 101 and the second end 102 are opposite to each other. The button chamber 14 is formed in the casing 10 and has a button opening formed through an external peripheral surface of the casing 10. The engagement chamber 12 is formed in the casing 10, is located between the first end 101 and the button chamber 14, and communicates with the button chamber 14. The valve chamber 16 is formed in the casing 10, is located between the second end 102 and the button chamber 14, and communicates with the button chamber 14. The casing 10 has a connection portion 13 being adjacent to the second end 102 for connecting to a device or a pipe. In the embodiment, the connection portion 13 has an external thread spirally formed around an external peripheral surface of the connection portion 13. As shown in FIG. 15, in another embodiment of the quick release connector 100A, the connection portion 13A of the casing 10A has an internal thread spirally formed around an internal peripheral surface of the connection portion 13A.

With reference to FIGS. 1 to 3, the cap 15 is connected to the first end 101 of the casing 10 to form a disengagement chamber 18 between the cap 15 and the casing 10 and communicating with the engagement chamber 12. A diameter of the disengagement chamber 18 is larger than a diameter of the engagement chamber 12. Specifically, the cap 15 is connected to the casing 10 via a threaded engagement.

The valve device 60 is disposed in the valve chamber 16 of the casing 10 and is configured to selectively close the valve chamber 16. The valve device 60 includes a sealing collar 61, a valve body 63, and a valve spring 65. The sealing collar 61 is tightly disposed in the valve chamber 16 and has a through hole via which the button chamber 14 communicates with the valve chamber 16. The valve body 63 slidably extends into the through hole of the sealing collar 61. The valve spring 65 is disposed in the valve chamber 16 between the casing 10 and the valve body 63, and provides a force to push the valve body 63 for keeping the valve body 63 in a closed condition.

With reference to FIGS. 2 to 6, the safety button 20 is movably disposed in the button chamber 14. The safety button 20 includes a button passage 22, an upper rib 23, and a lower rib 25. The button passage 22 is formed through the safety button 20 and communicates with the engagement chamber 12, is similar to an oval passage, and has a first width W1 defined in an up-down direction and a second width W2 defined in a left-right direction. The first width W1 is larger than the second width W2. The button passage 22 has an upper curved surface 221 concave toward the button opening of the button chamber 14 and a lower curved surface 223 concave away from the button opening of the button chamber 14. A central axis A1 of the upper curved surface 221 is different from a central axis A2 of the lower curved surface 223, and is located upper than the central axis A2. That is, the central axis A1 of the upper curved surface 221 is located between the button opening of the button chamber 14 and the central axis A2 of the lower curved surface 223. The upper rib 23 protrudes from the upper curved surface 221 of the button passage 22. The lower rib 25 protrudes from the lower curved surface 223 of the button passage 22 and is located between the upper rib 23 and the engagement chamber 12. The lower rib 25 has a slope 252 facing toward the engagement chamber 12 and away from the upper rib 23.

The button spring 30 is disposed in the button chamber 14 and between the safety button 20 and the casing 10 to provide a force to push the safety button 20 toward the button opening of the button chamber 14.

Figure 8:
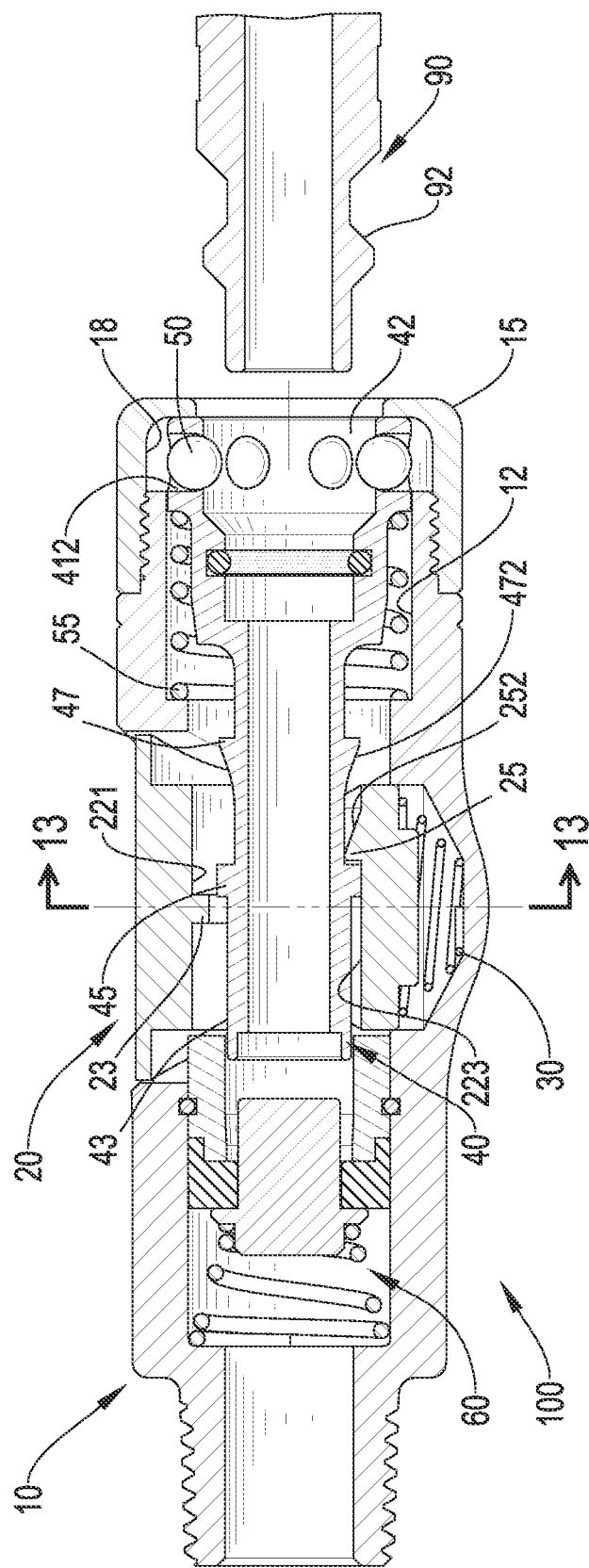
FIG. 8 is an operational cross-sectional side view of the quick release connector in FIG. 1 showing that a plug is to connect to the quick release connector.
Figure 10:
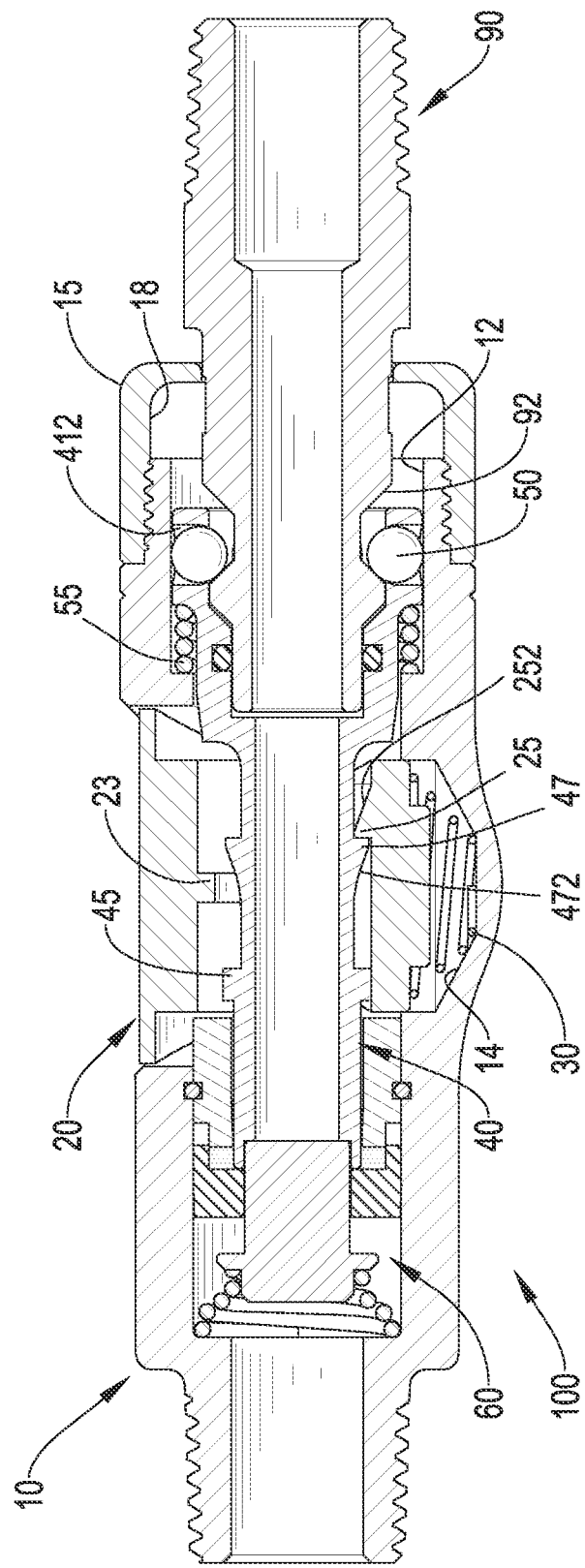
FIG. 10 is an operational cross-sectional side view of the quick release connector in FIG. 8 showing that the sliding body engages with the safety button.
Figure 11:
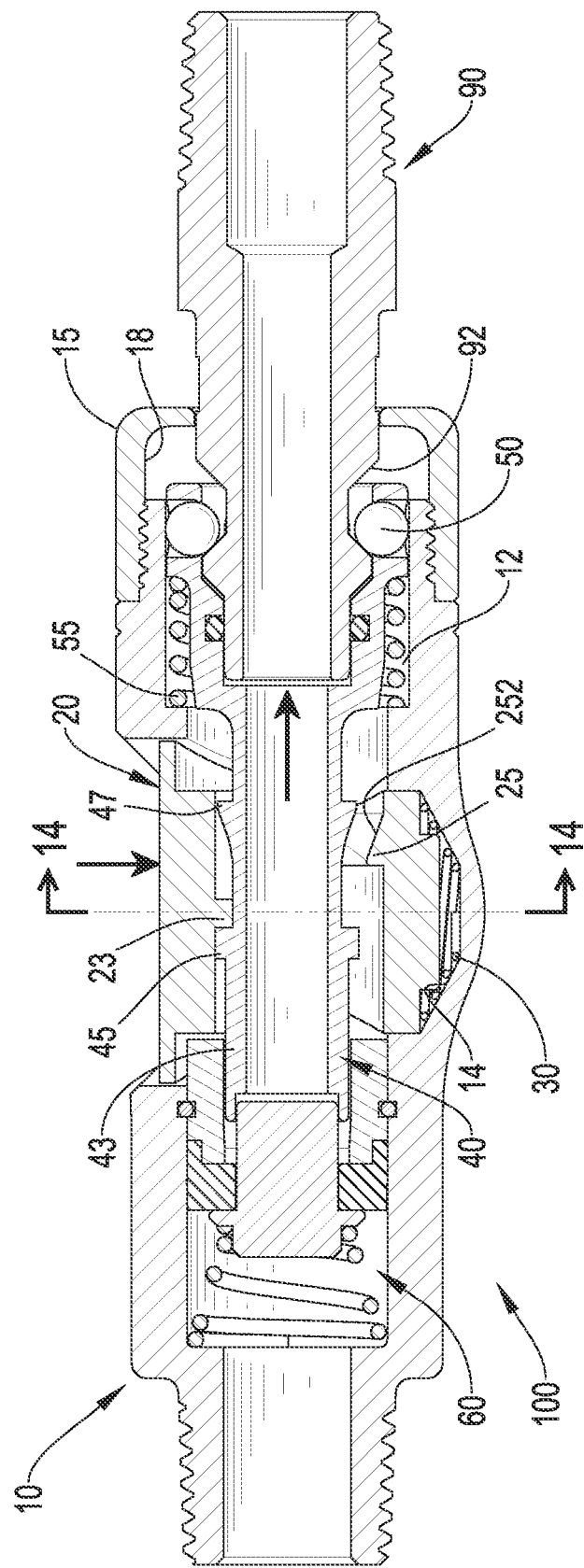
FIG. 11 is an operational cross-sectional side view of the quick release connector in FIG. 8 showing that the safety button is pressed to engage with the sliding body.

With reference to FIGS. 2, 3, 8, 10 and 11, the sliding body 40 is slidable relative to the casing 10 and the safety button 20 and extends into the engagement chamber 12 and the button passage 22 of the safety button 20. The sliding body 40 includes a disconnection position as shown in FIGS. 3 and 8, a connection position as shown in FIG. 10, and a releasing position as shown in FIG. 11.

With reference to FIGS. 2, 3 and, 7, the sliding body 40 includes a channel 42, a socket portion 41, multiple ball holes 412, a switching portion 43, a first flange 45, and a second flange 47. The channel 42 is formed through the sliding body 40. The socket portion 41 is slidable between the disengagement chamber 18 and the engagement chamber 12. The multiple ball holes 412 are arranged around the socket portion 41 at angular intervals, are formed through the socket portion 41, and communicate with the channel 42. The switching portion 43 extends into the button passage 22 and is capable of sliding to switch the valve device 60. The first flange 45 radially protrudes from an external peripheral surface of the switching portion 43. The second flange 47 radially protrudes from the external peripheral surface of the switching portion 43 and located between the first flange 45 and the socket portion 41. The second flange 47 has a conical surface 472 facing toward the first flange 45.

With reference to FIGS. 10 and 11, the first flange 45 of the sliding body 40 is capable of engaging with the upper rib 23 of the safety button 20 while the safety button 20 is being pressed as shown in FIG. 11. The second flange 47 of the sliding body 40 is capable of engaging with the lower rib 25 of the safety button 20 while the safety button 20 is being released as shown in FIG. 10.

With reference to FIGS. 2 and 3, the multiple balls 50 are respectively disposed in the ball holes 412 and are capable of partially extending into the channel 42. The sliding spring 55 is disposed in the engagement chamber 12 between the casing 10 and the sliding body 40 and provides a force to push the sliding body 40 toward the cap 15. More specifically, the sliding spring 55 surrounds the sliding body 40 and abuts against the casing 10 and the socket portion 41 of the sliding body 40.

Preferably, the casing 10, the safety button 20, and the sliding body 40 may be made of a metallic material for better structural strength. The quick release connector 100 can bear higher pressure and is applicable in a high pressure system.

Figure 13:
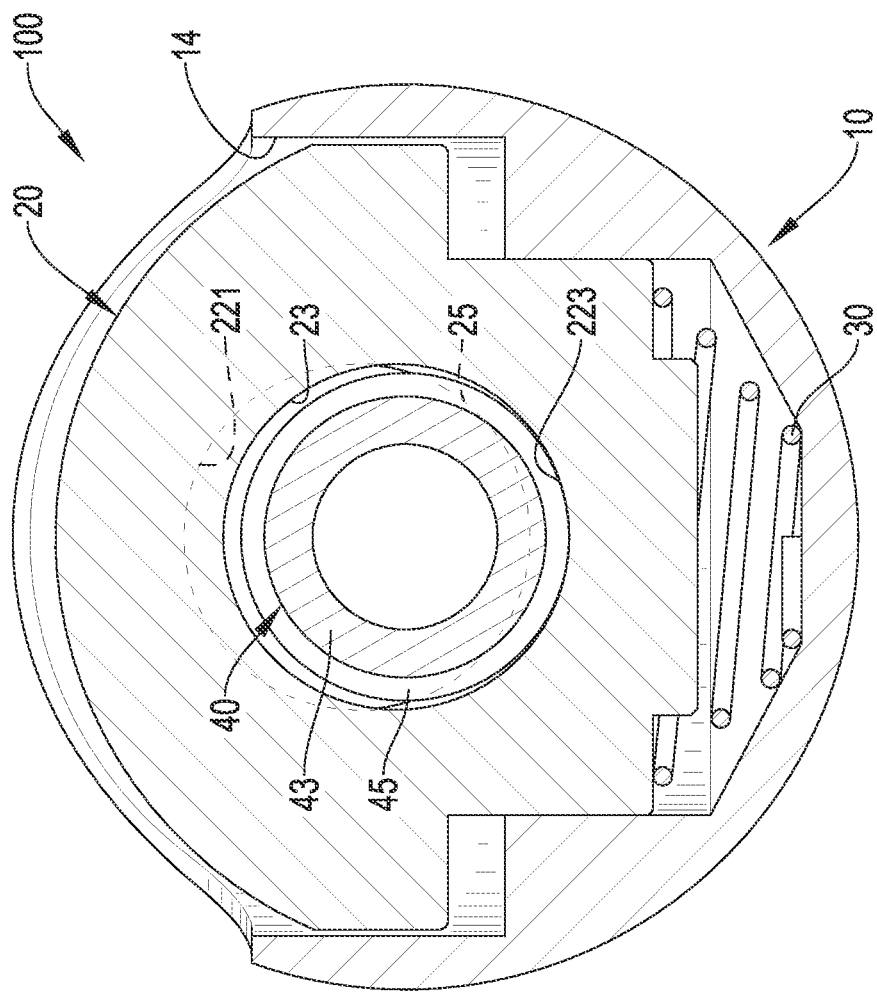
FIG. 13 is a cross-sectional end view of the quick release connector along line 13-13 in FIG. 8.

With reference to FIGS. 3, 8, and 13, when the sliding body 40 is located at the disconnection position, the sliding spring 55 pushes the sliding body 40 to abut against the cap 15 and to separate the sliding body 40 from the valve device 60. The ball holes 412 are located at the disengagement chamber 18. The first flange 45 is located between the upper rib 23 and the lower rib 25. The safety button 20 is pushed up by the button spring 30, and the lower curved surface 223 and the lower rib 25 are moved up to abut against the first flange 45 and the switching portion 43.

Figure 9:
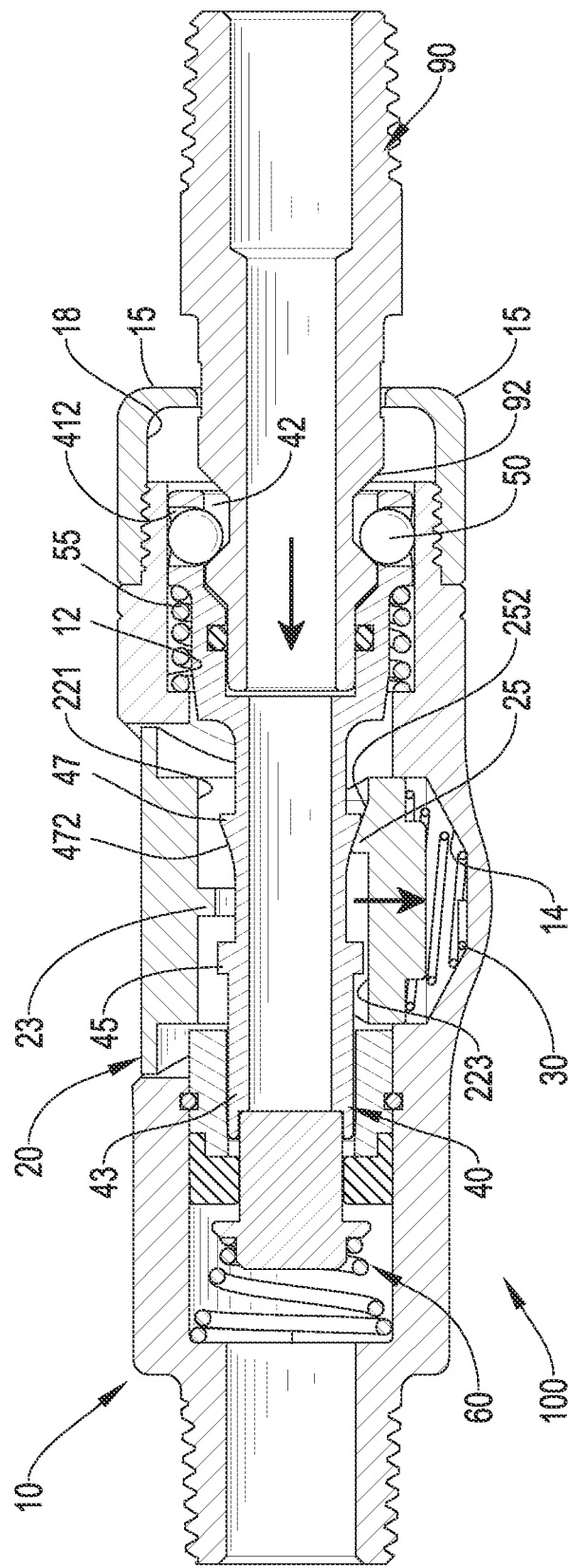
FIG. 9 is an operational cross-sectional side view of the quick release connector in FIG. 8 showing that the plug is inserted into the quick release connector to push the sliding body to move inward.

With reference to FIGS. 8 and 9, when the plug 90 is inserted into the quick release connector 100, the plug 90 is moved into the channel 42 of the sliding body 40. At this moment, the balls 50 are located at the disengagement chamber 18 and are free from being pushed outwardly by the plug 90 and to allow an engagement groove 92 of the plug 90 to be moved to align with the balls 50. When the plug 90 is further moved inward, the sliding body 40 is pushed by the plug 90 and slides toward the valve device 60. The balls 50 and the sliding body 40 are moved into the engagement chamber 12. The balls 50 engage with the engagement groove 92 to engage the sliding body 40 with the plug 90. The valve device 60 is pushed by an end of the switching portion 43 of the sliding body 40 and opens accordingly. During the movement of the sliding body 40, the conical surface 472 of the second flange 47 of the sliding body 40 slides, abuts against the slope 252 of the lower rib 25, and provides a vertical component force for pressing the safety button 20 downward. Hence, the second flange 47 is freed and able to pass the lower rib 25.

With reference to FIG. 10, after the second flange 47 has passed the lower rib 25, the safety button 20 is pushed up by the button spring 30, and the lower rib 25 is moved up to engage with the second flange 47 to keep the sliding body 40 at the connection position.

Figure 14:
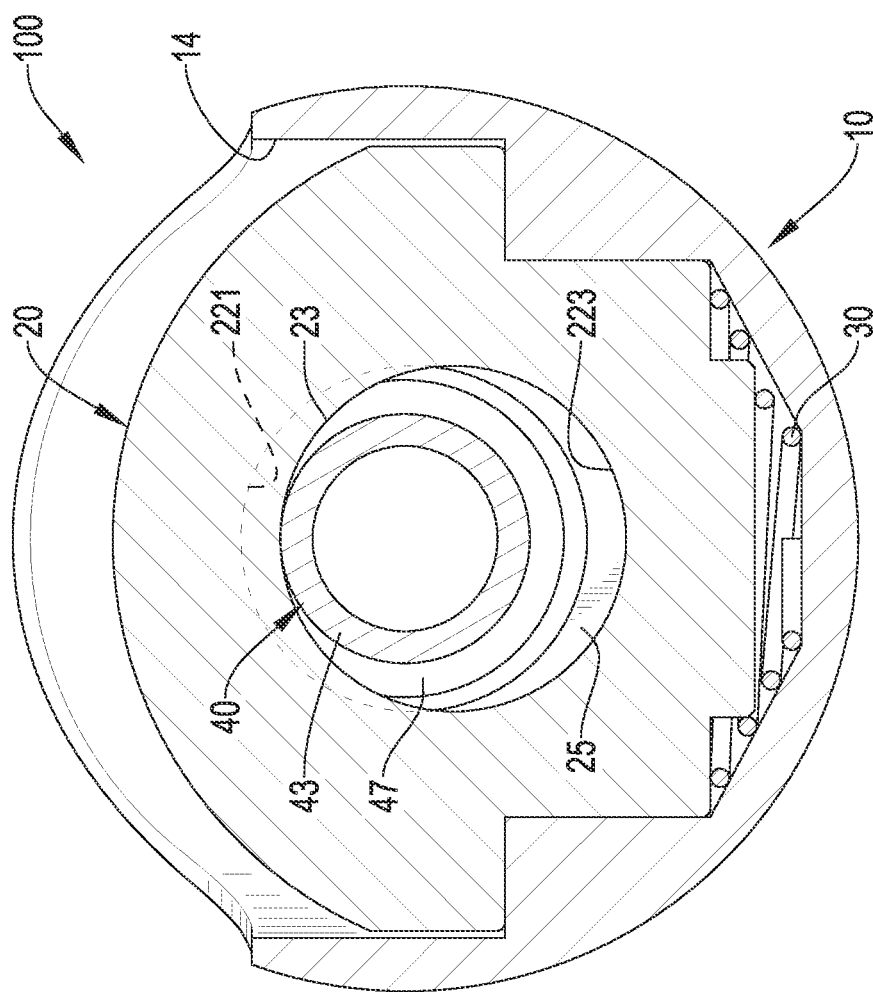
FIG. 14 is a cross-sectional end view of the quick release connector along line 14-14 in FIG. 11.

With reference to FIGS. 11 and 14, to release the plug 90, the safety button 20 is presses down to make an edge of the lower rib 25 lower than an edge of the second flange 47. The sliding body 40 is pushed by the sliding spring 55 to move toward the cap 15, and the first flange 45 abuts against and engages with the upper rib 23 to keep the sliding body 40 in position. The valve device 60 is closed again. The plug 90 keeps engaging with the balls 50 and cannot be removed from the quick release connector 100 while the safety button 20 is being pressed. The high pressure gas inside the sliding body 40 can be released from the plug 90 at this moment.

Figure 12:
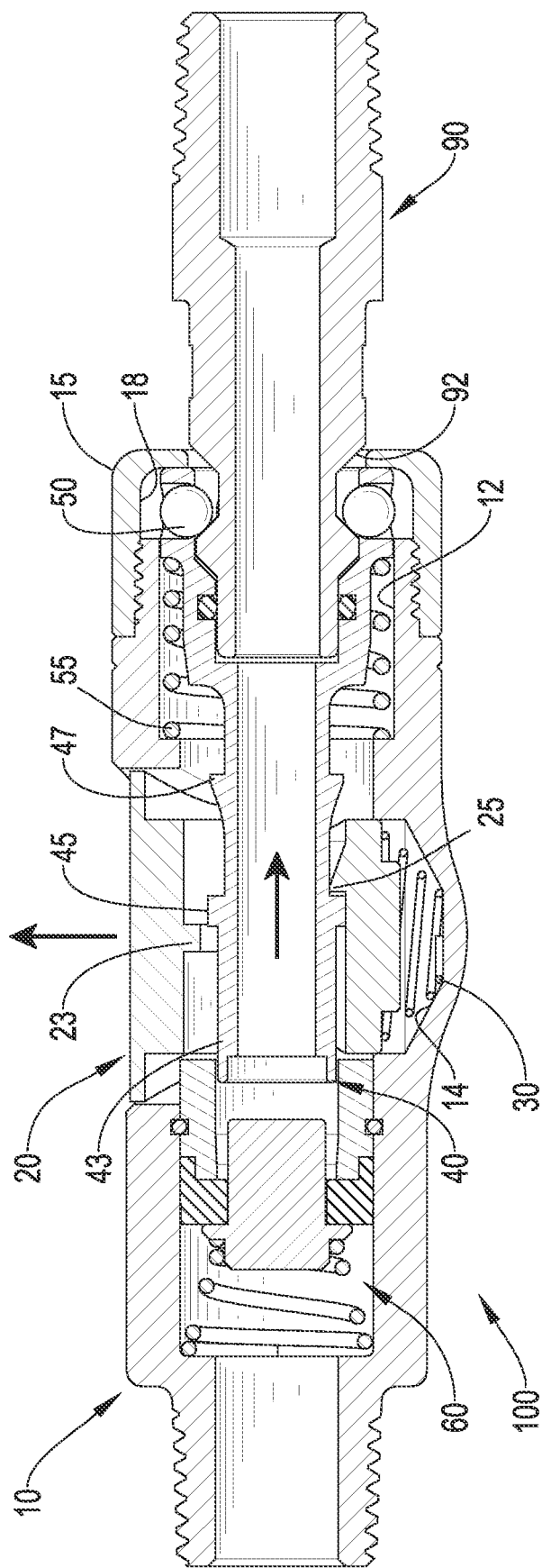
FIG. 12 is an operational cross-sectional side view of the quick release connector in FIG. 11 showing that the safety button is released.

With reference to FIG. 12, after that, the safety button 20 is released and is pushed up by the button spring 30 to move the edge of the upper rib 23 higher than the edge of the first flange 45. The sliding body 40 is pushed by the sliding spring 55 to move toward the cap 15, and the first flange 45 passes the upper rib 23 to the disconnection position. The balls 50 are disposed at the disengagement chamber 18, and the plug 90 is freed and able to be removed from the quick release connector 100.

The safety button 20 is pressed to allow the valve device 60 being closed and to block the sliding body 40 by the engagement between the first flange 45 and the upper rib 23. The plug 90 is free from suddenly separating from the quick release connector 100 and can be released safely. Safety to usage of the quick release connector 100 is improved.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A quick release connector comprising:
   a casing including
      a first end;
      a second end being opposite to the first end;
      a button chamber formed in the casing and having a button opening formed through an external peripheral surface of the casing; and
      an engagement chamber formed in the casing, located between the first end and the button chamber, and communicating with the button chamber;
   a cap connected to the first end of the casing to form a disengagement chamber between the cap and the casing and communicating with the engagement chamber, a diameter of the disengagement chamber being larger than a diameter of the engagement chamber;
   a safety button movably disposed in the button chamber of the casing and including
      a button passage formed through the safety button, communicating with the engagement chamber, and having
         an upper curved surface concave toward the button opening of the button chamber; and
         a lower curved surface concave away from the button opening of the button chamber;
      an upper rib protruding from the upper curved surface of the button passage; and
      a lower rib protruding from the lower curved surface of the button passage, located between the upper rib and the engagement chamber, and having a slope facing toward the engagement chamber;
   a button spring disposed in the button chamber and between the safety button and the casing to provide a force to push the safety button toward the button opening of the button chamber;
   a sliding body being slidable relative to the casing and the safety button, extending into the engagement chamber of the casing and the button passage of the safety button, and including
      a channel formed through the sliding body;
      a socket portion being slidable between the disengagement chamber and the engagement chamber;
      multiple ball holes arranged around the socket portion at angular intervals, formed through the socket portion, and communicating with the channel;
      a switching portion extending into the button passage;
      a first flange radially protruding from an external peripheral surface of the switching portion and being capable of engaging with the upper rib of the safety button while the safety button is being pressed; and
      a second flange radially protruding from the external peripheral surface of the switching portion, located between the first flange and the socket portion, having a conical surface facing toward the first flange, and being capable of engaging with the lower rib of the safety button while the safety button is being released;
   multiple balls respectively disposed in the ball holes of the sliding body and being capable of partially extending into the channel; and a sliding spring disposed in the engagement chamber between the casing and the sliding body to provide a force to push the sliding body toward the cap.

2. The quick release connector as claimed in claim 1, wherein
the casing includes a valve chamber formed in the casing, located between the button chamber and the second end of the casing, and communicating with the button chamber of the casing;
the quick release connector comprises a valve device disposed in the valve chamber; and
the switching portion of the sliding body is capable of sliding to switch the valve device.

3. The quick release connector as claimed in claim 2, wherein
the button passage has a first width defined in an up-down direction and a second width defined in a left-right direction; and
the first width of the button passage is larger than the second width of the passage.

4. The quick release connector as claimed in claim 2, wherein
a central axis of the upper curved surface of the button passage is different from a central axis of the lower curved surface of the button passage and is located between the button opening of the button chamber and the central axis of the lower curved surface of the button passage.

5. The quick release connector as claimed in claim 2, wherein the casing, the safety button, and the sliding body are made of a metallic material.

6. The quick release connector as claimed in claim 2, wherein
the valve device includes
a sealing collar tightly disposed in the valve chamber and having a through hole formed through the sealing collar;
a valve body slidably extending into the through hole of the sealing collar; and
a valve spring disposed in the valve chamber between the casing and the valve body.

7. The quick release connector as claimed in claim 6, wherein
the button passage has a first width defined in an up-down direction and a second width defined in a left-right direction; and
the first width of the button passage is larger than the second width of the passage.

8. The quick release connector as claimed in claim 6, wherein
a central axis of the upper curved surface of the button passage is different from a central axis of the lower curved surface of the button passage and is located between the button opening of the button chamber and the central axis of the lower curved surface of the button passage.

9. The quick release connector as claimed in claim 6, wherein the casing, the safety button, and the sliding body are made of a metallic material.

10. The quick release connector as claimed in claim 1, wherein
the button passage has a first width defined in an up-down direction and a second width defined in a left-right direction; and
the first width of the button passage is larger than the second width of the passage.

11. The quick release connector as claimed in claim 1, wherein
a central axis of the upper curved surface of the button passage is different from a central axis of the lower curved surface of the button passage and is located between the button opening of the button chamber and the central axis of the lower curved surface of the button passage.

12. The quick release connector as claimed in claim 1, wherein the casing, the safety button, and the sliding body are made of a metallic material.

\* \* \* \* \*